Dec. 30, 1930.      H. G. NORWOOD      1,786,503
SPRING NUT LOCK WASHER
Filed Aug. 10, 1929

Inventor
HARRY G. NORWOOD
Attorney A. D. T. Libby

000

UNITED STATES PATENT OFFICE

HARRY G. NORWOOD, OF BALTIMORE, MARYLAND, ASSIGNOR TO POSITIVE LOCK WASHER COMPANY, OF NEWARK, NEW JERSEY

SPRING NUT-LOCK WASHER

Application filed August 10, 1929. Serial No. 384,858.

This invention relates to an improved form of spring lock washer, particularly adapted for use for heavy work or where high pressures are applied to the washers, such as in railroad work in bolting ties together, and for other heavy duty work.

It is the principal object of my invention to provide a spring lock washer which will give at least spring effects in two distinct ways—first, by the offset of the split ends of the washer, and second, due to the shape or cross-sectional form of the washer stock.

Another object of my invention is to provide a spring washer which will take a very high pressure and still retain its resilience and ability to take up for stretch in the bolt.

Another object of my invention is to provide a spring washer which cannot be distorted, by the tension of the nut, beyond its elastic limit or ability to maintain its spring effect to hold the joint tight.

My invention will be readily understood by reference to the annexed drawing, wherein.

Figure 1:
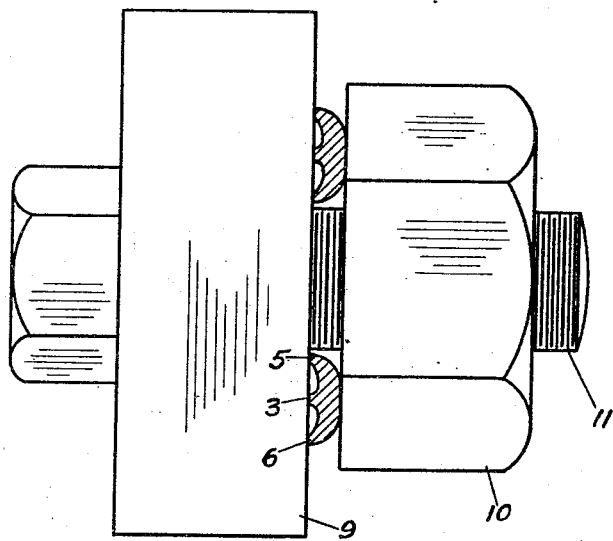
Figure 1 shows an assembled view of the washer between the nut and work piece, the washer being in a partly compressed state.
Figure 2:
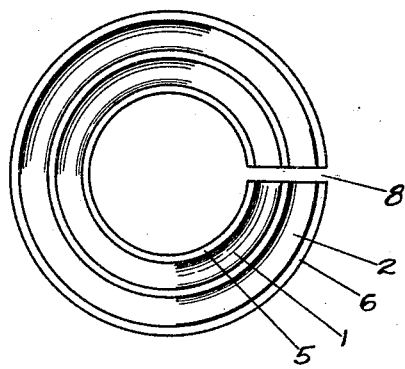
Figure 2 is a plan view of the face of the washer which engages the work.
Figure 3:
Figure 3 is a side-elevation of Figure 2.

In the construction of my improved washer, this is preferably made from drawn or rolled stock which is provided with a pair of grooves 1 and 2 which extend throughout the length of the stock.

Separating the grooves 1 and 2, is an annular abutment 3 which is so formed as to be depressed below the plane 4 of the edges 5 and 6, as indicated by the space 7. This gives a cross-sectional form of the washer substantially in the shape of the letter E.

Figure 4:
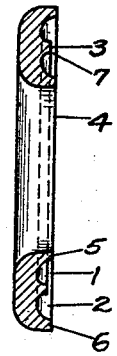
Figure 4 is a vertical section through Figure 2.

The strip stock which has been formed in the manner described and illustrated in Figure 4, is then preferably rolled in a spiral manner as is usual in the forming of lock washers, and cut off as indicated at 8.

As shown in Figure 1, the washer is shown clamped between the work 9 and the nut 10 on a bolt 11. When the washer is first compressed, a certain spring effect is produced by the closing in of the split ends of the washer. As further pressure is applied by the nut 10, the sides 5 and 6 of the washer are spread until the abutment 3 engages the work 9, and this resists the stress applied by the nut from spreading the edges 5 and 6 beyond their elastic limit, or beyond the point where they will lose their spring effect, thereby preventing the washer from becoming broken and holding the nut and bolt under spring tension at all times.

As will be seen, the first or initial tension or stress is applied to the edges 5 and 6 of the washer, and then the increased tension on the washer is transferred to the central part over the abutment 3. While I prefer to make the washer from rolled or drawn stock, it is within the scope of the invention to form the washer, and for some classes of work, the formed washer need not be even split.

Having thus described my invention, what I claim is:

1. A spring nut lock washer having an E-shaped transverse cross-section taken on any radius of the washer.

2. A spring nut lock washer formed spirally and cut to leave a split, the stock having substantially an E-shaped cross-section from end to end.

3. A spring nut lock washer having a split and the ends adjacent the split offset a predetermined amount in opposite directions to give a certain spring effect, said washer having a further spring effect by reason of its cross-sectional shape which is substantially like an E.

4. A spring nut lock washer having a split and the ends adjacent the split offset a predetermined amount in opposite directions to give a certain spring effect, said washer having a cross-sectional shape such that the inner and outer edges normally contact with the work and are adapted to spread, whereby an annular central part between the edges is brought into engagement with the work to resist further spreading of said edges.

5. A spring nut lock washer having a cross-section such that the opposite edges on one side are substantially in the same plane, while the central portion is spaced from said edges and depressed below said plane.

6. A spring nut lock washer having a pair of grooves on one face thereof and an abutment between said grooves, said abutment being below the plane of the two edges formed by said grooves.

7. A spring nut lock washer having the material of the washer formed so as to provide at least an outer engaging edge on the side away from the nut, with an annular abutment within the confines of said outer edge, said abutment being brought into engagement on extreme pressure applied to the washer as and for the purposes described.

In testimony whereof, I affix my signature.

HARRY G. NORWOOD.